Apr. 24, 1923. 1,452,912
W. HARTENSTEIN
PLOW FOR PLANTING POTATOES
Filed Nov. 15, 1920
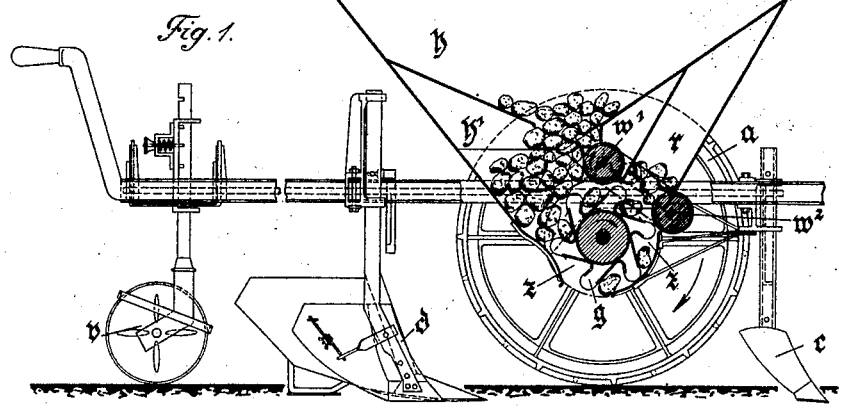
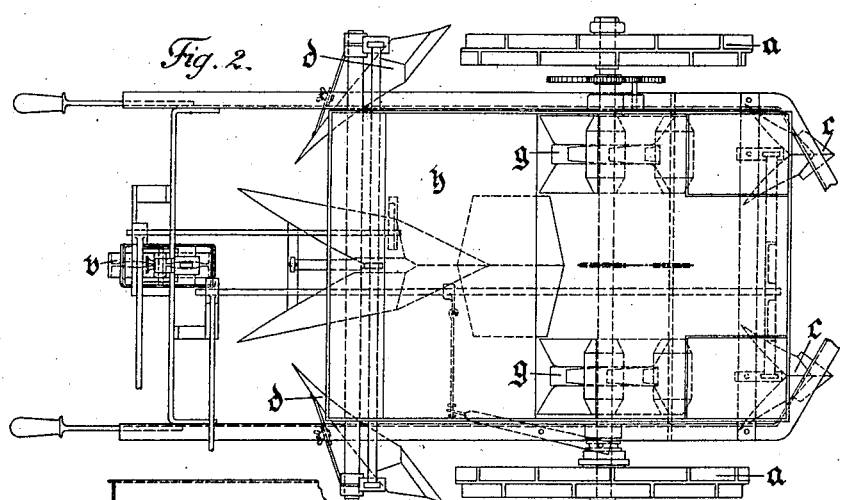
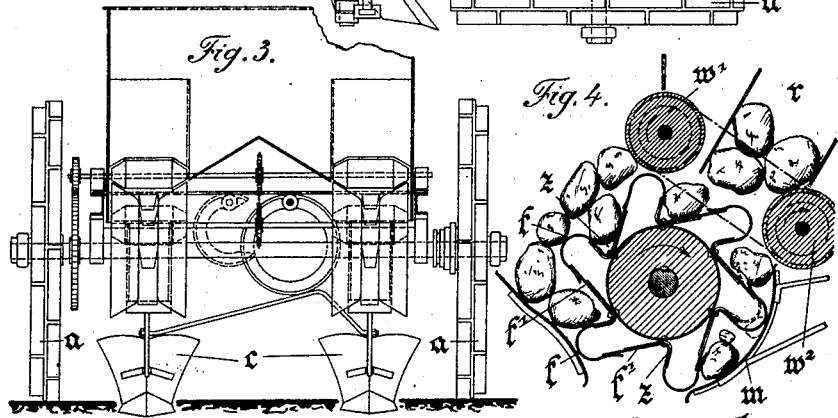
Inventor
Willy Hartenstein
By C. P. Grefel
Attorney Patented Apr. 24, 1923.

1,452,912

UNITED STATES PATENT OFFICE.

WILLY HARTENSTEIN, OF DARMSTADT, GERMANY, ASSIGNOR TO JOSEPHINE AMAN, RUTHERFORD, NEW JERSEY.

PLOW FOR PLANTING POTATOES.

Application filed November 15, 1920. Serial No. 424,332.

*To all whom it may concern:*

Be it known that I, WILLY HARTENSTEIN, a citizen of the German Republic, residing at Darmstadt, Germany, have invented certain new and useful Improvements in Plows for Planting Potatoes, of which the following is a specification.

This invention relates to a plow for planting potatoes.

In the accompanying drawings the invention is shown by way of example.

Fig. 1 is a side elevation, the planting device being shown in vertical section.

Fig. 2 is a plan view,

Fig. 3 a rear view,

Fig. 4 shows the delivery drum of the planting device.

The improved plow consists of a frame mounted upon running wheels $a$, $a$ and upon a steering wheel $b$. Shares $c$ for drawing the furrows and ridge-shares $d$ for covering the potatoes are mounted upon the frame so that they can be adjusted in vertical position and can be raised or lowered by means of a hand lever with eccentric. To the rear of the two sets of shares $c$—$c$ the potato reservoir is arranged, in the lower part of which the delivery drums $g$ are arranged. There are provided as many delivery drums $g$ as there are furrows to be drawn. These delivery drums which are rotated in a convenient manner from the running wheels have along their circumference elastic compartments $z$ designed to receive each one potato. The delivery drum of improved construction has the following advantages:—

The springs of which the compartments $z$ are formed protect the potatoes from being damaged.

A miss in placing the potatoes in the furrow cannot occur.

The distance between the potatos can be varies through varying the number of compartments on the circumference of the drum.

The elastic compartments are constructed as follows:—

The walls of the compartments $z$ are formed of blade springs $f$, $f'$ which give way under the pressure of the potato so that the potatoes are loosely retained in the compartments.

The placing of the potatoes in the furrow is effected in the following manner:—

The potatoes drop from the main receptacle $h$ through the funnel $h'$ into the compartments $z$. The filled compartments of the drum pass under a stripping roller $w'$ which keeps back the other potatoes. The compartments pass then under the auxiliary reservoir $r$ from which a potato drops into those compartments which are empty. In front of the auxiliary reservoir $r$ a stripping roller $w^2$ is arranged which serves for keeping back the potatoes. Below this second stripping roller $w^2$ a sliding plate $m$ is arranged which is designed to prevent the premature dropping out of the potatoes from the compartments. The potatoes drop off the slide $m$ at regular intervals into the furrow drawn by the front share to be covered with earth by the rear covering and ridge share.

I claim:—

1. A receptacle having a main and an auxiliary compartment, a pocketed drum rotating in open communication with both compartments, and means in both compartments for stripping the excess potatoes from the pockets of the drum.

2. A receptacle having a main and a auxiliary compartment, a pocketed drum rotating in communication with said compartments, stripping means in the compartments near the periphery of the pocketed drum, and a sliding plate extending along the periphery of the drum at the lower side thereof.

3. A receptacle for potatoes or the like, a drum rotating therebeneath having pockets on its periphery with yielding walls means to strip the excess potatoes from the pockets, and sliding means at the lower side of the drum for controlling the outlet of the potatoes from the pockets of the drum.

4. In combination, a potato reservoir, a delivery drum rotatably mounted in the lower end of said reservoir, means for rotating said drum, compartments upon the circumference of said drum adapted to contain each one potato and made from blade springs, a stripping roller above said delivery drum, a second stripping roller at the side of the said drum, an auxiliary potato reservoir between said two stripping rollers, and means for guiding the potatoes which drop out of the said compartments.

5. In combination, a potato receptacle, a delivery drum rotatably mounted in the lower end of said receptacle, means for rotating said drum, compartments upon the circumference of said drum adapted to contain each one potato and made from blade springs, a stripping roller above said delivery drum and a stripping roller at the side of said drum, an auxiliary potato reservoir between said two stripping rollers and a curved slide plate for the reception of the potatoes dropping out of said compartments, said slide plate being mounted below said second stripping roller.

In testimony whereof I affix my signature hereunder.

Dr. Ing. WILLY HARTENSTEIN.